United States Patent Office 2,716,101
Patented Aug. 23, 1955

2,716,101

POLYMERIC ORGANO-PHOSPHONATES CONTAINING PHOSPHATO GROUPS

Harry W. Coover, Jr. and Marvin A. McCall, Kingsport, Tenn., assignors to Eastman Kodak Company, Rochester, N. Y., a corporation of New Jersey No Drawing. Application September 10, 1952,
Serial No. 308,929

8 Claims. (Cl. 260—61)

This invention relates to resinous polymeric organo-phosphonates, and more particularly to resinous, polymeric organophosphonates containing phosphato groups, and to processes for preparing such modified polyphosphonates.

We have found that when dihydroxy aromatics are condensed with arylphosphonic acid dichlorides in approximately equimolar proportions in the absence of other reactants, the linear polymers obtained from such materials as phenylphosphonic acid dichloride and hydroquinone are somewhat limited in their applications because they tend to be hard, brittle materials having relatively low softening points. On the other hand, when long chain alkanephosphonic acid dichlorides are condensed with hydroquinone, soft, pliable polymers are obtained. These soft pliable polymers have many valuable properties, but show rather poor elasticity and hence also have but limited application.

It was surprising, therefore, to discover that by co-condensation of even small amounts of a tri-functional phosphorus compound with the alkane-, or arylphosphonic acid dichlorides and a dihydroxy aromatic compound, the polymers obtained contain phosphato groups apparently cross-linked and show greatly improved properties. For example, by the incorporation of 5 mole percent of triphenyl phosphate into the polymer obtained from heptanephosphonyl dichloride and hydroquinone, a soft, rubbery polymer is obtained which exhibits excellent elastic properties. The same polymer prepared without the triphenyl phosphate is a soft, pliable polymer having poor elastic properties. By increasing the amount of the trifunctional phosphorus compound in the polyphosphonate resin, the resultant polymers are found to be tougher, harder and of higher melting points. The polymers of the invention are, therefore, valuable materials for the production of noninflammable fibers, rubbers, molding compositions, etc.

It is, accordingly, an object of the invention to provide resinous, polymeric organo-phosphonates containing phosphato groups. Another object is to provide methods for preparing such resinous polymers. Other objects will become apparent hereinafter.

In accordance with the invention, we prepare our new class of condensation polymers containing phosphato groups by heating in the presence of an anhydrous alkaline-earth halide condensation catalyst (e. g., calcium chloride, zinc chloride, etc., but more especially anhydrous magnesium chloride) a mixture comprising approximately 50.0 mole percent of a dihydroxy aromatic compound, from 0.1 to 49.9 mole percent of an organo-phosphonic acid dichloride having the general formula:

wherein R represents an alkyl group containing from 1 to 12 carbon atoms (e. g., methyl, ethyl, propyl, isopropyl, butyl, sec. butyl, decyl, dodecyl, etc. groups), an aryl group (e. g. phenyl or tolyl groups), a benzyl group or a cycloalkyl group (e. g. cyclopentyl or cyclohexyl groups), and from 49.9 to 0.1 mole per cent of a tri-functional phosphorus compound, at a temperature of from 90° to 300° C., until the condensation reaction is substantially complete, the evolved hydrogen chloride being eliminated by sweeping out with a dry inert gas such as dry nitrogen. Advantageously, reduced pressures and increased temperatures are employed to facilitate removal of the hydrogen chloride more rapidly and completely, and to promote completion of the reaction. By employing proportions as set forth in the preceding, substantially all of the reactants enter into reaction so that the final products are in relatively pure condition. The amount of catalyst can vary from about 0.1 to 3.0 percent or even higher, based on the weight of the reactants. Usually all of the quantities to be employed of the reactants and the catalyst are mixed together and the reaction performed as above described. However, good results are also obtainable by adding only part of the organo-phosphonyl dichloride to the full amount of the dihydroxy aromatic compound and catalyst, and after the reaction has proceeded for some time at, for example, 90°–130° C., adding the remainder of the organo-phosphonyl dichloride and the desired amount of the tri-functional phosphorus compound, followed by heating and elimination of hydrogen chloride to completion of the reaction. In the process as described, the condensation takes place in the proportions of one mole of the dihydroxy aromatic compound to a total of one mole of the organo-phosphonic acid dichloride and the tri-functional phosphorus compound.

Mixtures of one or more of the organo-phosphonic acid dichlorides or the tri-functional phosphate compound or the dihydroxy aromatic compound can be employed within the above stated limiting proportions. As the amount of tri-functional phosphate compound is increased, the resultant condensation polymer becomes tougher, harder and of higher softening point. When a hard, tough material is desired, from 10 to 49.9 mole percent of the tri-functional compound should be used. For obtaining polymers with greatly improved elastic properties, 0.1 to 10 mole percent can be used. Higher molecular weight materials are obtainable by carrying out the reaction at relatively higher temperatures under reduced pressures.

Suitable dihydroxy aromatic compounds which can be employed in the practice of our invention include resorcinol, catechol, hydroquinone, dihydroxy toluenes, dihydroxy xylenes, dihydroxydiphenyls such as p,p′-dihydroxydiphenyl, dihydroxydiphenyl sulfones, etc. The organo-phosphonic acid dichlorides employed in the invention are selected from the group including methanephosphonyl dichloride, ethanephosphonyl dichloride, propanephosphonyl dichloride, isopropanephosphonyl dichloride, butanephosphonyl dichloride, sec. butanephosphonyl dichloride, heptanephosphonyl dichloride, decanephosphonyl dichloride, dodecanephosphonyl dichloride, chloromethanephosphonyl dichloride, chloroethanephosphonyl dichloride, chloropropanephosphonyl dichloride, benzenephosphonyl dichloride, p-toluenephosphonyl dichloride, benzylphosphonyl dichloride, cyclopentanephosphonyl dichloride, cyclohexanephosphonyl dichloride, etc. Suitable tri-functional phosphorus compounds employed in preparing the resinous polymers of the invention include phosphorus oxychloride, triphenyl phosphate, tricresyl phosphate, diphenylchlorophosphate, and phenyldichlorophosphate.

The following examples will serve further to illustrate our new polymeric organo-phosphonates and the manner of their preparation.

Example 1

A mixture of 5.5 g. (0.05 mole) of resorcinol, 10.85 g. (0.05 mole) of heptanephosphonyl dichloride

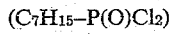

$(C_7H_{15}-P(O)Cl_2)$ 0.38 g. (0.0025 mole) of phosphorus oxychloride and 0.1 g. of anhydrous magnesium chloride was stirred slowly while the temperature was gradually raised to 150° C. over a three hour period. Dry nitrogen was bubbled into the reaction liquid to help remove the hydrogen chloride which formed and to facilitate the stirring. After the reaction mixture had become quite viscous, the pressure was gradually reduced so that the hydrogen chloride was removed more rapidly and completely, but care was taken not to distill out the low molecular weight material or the unreacted heptanephosphonyl dichloride or phosphorus oxychloride. A final pressure of 3–5 mm. was obtained after about one hour. Heating and stirring was then continued for 3–4 more hours or until the reaction mass became so viscous that stirring was no longer possible. The product was a very tough, rubbery, flameproof material.

In place of resorcinol in the above example, there can be substituted an equivalent amount of any other of the mentioned dihydroxy aromatic compounds such as catechol, hydroquinone, p,p'-dihydroxydiphenyl, etc. to give generally similar tough and rubbery products. Also the heptanephosphonyl dichloride in the above example can be substituted by an equivalent amount of any of the other mentioned alkanephosphonyl dichlorides such as methanephosphonyl dichloride, ethanephosphonyl dichloride, etc. The phosphorus oxychloride can also be substituted by an equivalent amount of the other tri-functional phosphate compounds such as triphenyl phosphate, phenyl dichlorophosphate, and the like. In all cases the products obtained are generally similar in properties to that of the above example.

Example 2

A mixture of 11.0 g. (0.1 mole) of hydroquinone, 18.52 g. (0.095 mole) of benzenephosphonyl dichloride $(C_6H_5-P(O)Cl_2)$ 1.05 g. (0.005 mole) of phenyl dichlorophosphate and 0.1 g. of anhydrous magnesium chloride was stirred slowly while the temperature was gradually raised to 150° C. over a period of three hours. Dry nitrogen was bubbled into the reacting liquid to help remove the hydrogen chloride which formed and to facilitate the stirring. After the reaction mixture had become quite viscous, the pressure was gradually reduced for more rapid and complete removal of the hydrogen chloride, but care was taken not to distill out the low molecular weight material or the unreacted benzenephosphonyl dichloride. A final pressure of 4–5 mm. was obtained after about one hour. Heating was also increased gradually until a temperature of 265° C. was attained after 7 hours reaction time. Some phenol that was formed by cross-linking of the phenyl dichlorophosphate was distilled out of the reaction mixture at this temperature and pressure. To completely remove any residual phenol and traces of hydrogen chloride, the temperature was rapidly raised to 300° C. over a 45 minute period. There resulted a hard, tough, non-inflammable polymer which contained none of the original reactants.

Example 3

A mixture of 11.0 g. (0.1 mole) of hydroquinone, 8.55 g. (0.051 mole) of chloromethanephosphonyl dichloride 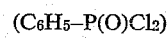 ($ClCH_2-P(O)Cl_2$), and 0.1 g. of anhydrous magnesium chloride was stirred slowly while the temperature was gradually raised to 90° C. and maintained for one hour. Dry nitrogen was bubbled into the reaction mixture to help remove the hydrogen chloride which was formed and to facilitate the stirring. Care was taken not to distill out any of the low molecular weight material or unreacted chloromethanephosphonyl dichloride. The temperature was gradually raised to 120° C., at the end of the first 3 hours when 8.55 g. (0.051 mole) more of chloromethanephosphonyl dichloride and 1.05 g. (0.005 mole) of phenyl dichlorophosphate were added. After the mixture had again become viscous, the pressure was gradually reduced to remove the hydrogen chloride and phenol which formed. The vacuum was gradually increased until a pressure of 1–2 mm. and a temperature of 250 C. was attained. After the evolution of hydrogen chloride and phenol had practically stopped (5–8 hours total time), a clear amber-colored product was obtained. On cooling to room temperature, it was a tough, rubbery, flameproof material which contained substantially none of the original reactants.

In place of the chloromethanephosphonyl chloride in the above example, there can be substituted an equivalent amount of any other of the mentioned ω-alkanephosphonyl dichlorides such as β-chloroethanephosphonyl dichloride, γ-chloropropanephosphonyl chloride, ω-chloroheptanephosphonyl chloride, etc., to give generally similar tough rubbery and flameproof materials. Similarly the hydroquinone and phenyldichlorophosphate in the above example can be substituted, respectively, by any other of the mentioned dihydroxy aromatic compounds and by any other of the mentioned tri-functional phosphate compounds.

Example 4

A mixture of 11.0 g. (0.1 mole) of hydroquinone, 8.38 g. (0.043 mole) of benzenephosphonyl dichloride and 0.1 g. of anhydrous magnesium chloride was stirred slowly while the temperature was gradually raised to 90° C. and maintained for one hour. Dry nitrogen was bubbled into the reaction mixture to help remove the hydrogen chloride that was formed and to facilitate the stirring. After the first hour at 90° C. and at atmospheric pressure, the temperature was gradually increased to 120° C. by the end of the first three hours. At this point, a mixture of 8.19 g. (0.042 mole) of benezenephosphonyl dichloride and 2.11 g. (0.01 mole) of phenyl dichlorophosphate was added, and as soon as the mixture had become viscous (about an hour), the pressure was gradually reduced to 1–2 mm. in order to remove the hydrogen chloride more rapidly and completely. Phenol, formed by the cross-linking of the phenyl dichlorophosphate, was also distilled from the reaction mixture. Precautions were taken not to distill out any of the low molecular weight material or unreacted benzenephosphonyl dichloride. The stirring and heating were continued for 3–4 hours more or until the reaction mass became so viscous that stirring was no longer possible. On cooling to normal conditions, the product was a very tough, rubbery material which contained substantially none of the original reactants.

Other resinous, polymeric organo-phosphonates modified by co-condensed phosphato groups can also be prepared according to the procedures of the examples by substituting any of the mentioned dihydroxy aromatic compounds, alkane—or arylphosphonic acid dichlorides or mentioned tri-functional phosphorus compounds, the resulting polymers having generally similar properties to those described in the examples. As previously mentioned, all of the polymeric products of the invention are valuable materials for the preparation of non-inflammable fibers, rubbers, molding and extrusion compositions. Various other materials such as fillers, dyes, sizes, etc. can be readily incorporated. Mixtures of polymeric products can be employed. Many of the polymers are soluble in such solvents as dimethyl formamide and dimethyl acetamide.

What we claim is:

1. A process for preparing resinous polymeric organophosphonates containing phosphato groups which comprises heating in the presence of an anhydrous alkaline-earth halide condensation catalyst a mixture comprising approximately 50.0 mole percent of a dihydroxy aromatic compound selected from the group consisting of a dihydroxybenzene, a dihydroxy diphenyl, and a dihydroxydiphenyl sulfone, and from 0.1 to 49.9 mole percent of an organo-phosphonic acid dichloride having the general formula:

wherein R represents a member selected from the group consisting of an alkyl group containing from 1 to 12 carbon atoms, a chloroalkyl group containing from 1 to 12 carbon atoms, a cyclohexyl group, a phenyl group and a tolyl group, and from 49.9 to 0.1 mole percent of a trifunctional phosphorus compound selected from the group consisting of phosphorus oxychloride, triphenyl phosphate, tricresyl phosphate, diphenylchlorophosphate and phenyl dichlorophosphate, at a temperature of from 90° to 300° C., until the condensation reaction is substantially complete.

2. A process for preparing a resinous, polymeric organo-phosphonate containing phosphato groups which comprises heating in the presence of anhydrous magnesium chloride a mixture comprising approximately 50.0 mole percent of resorcinol, from 0.1 to 49.9 mole percent of heptanephosphonyl dichloride and from 49.9 to 0.1 mole percent of phosphorus oxychloride, at a temperature of from 90° to 300° C., until the condensation reaction is substantially complete.

3. A process for preparing a resinous, polymeric organo-phosphonate containing phosphato groups which comprises heating in the presence of anhydrous magnesium chloride a mixture comprising approximately 50.0 mole percent of hydroquinone, from 0.1 to 49.9 mole percent of benzenephosphonyl dichloride and from 49.9 to 0.1 mole percent of phenyl dichlorophosphate, at a temperature of from 90° to 300° C., until the condensation reaction is substantially complete.

4. A process for preparing a resinous, polymeric organo-phosphonate containing phosphato groups which comprises heating in the presence of anhydrous magnesium chloride a mixture comprising approximately 50.0 mole percent of hydroquinone, from 0.1 to 49.9 mole percent of chloromethanephosphonyl dichloride and from 49.9 to 0.1 mole percent of phenyl dichlorophosphate, at a temperature of from 90° to 300° C., the said chloromethanephosphonyl dichloride being added in part to the full amount of the said hydroquinone and after this step of the reaction is substantially complete adding the remainder of the said chloromethanephosphnoyl dichloride and all of the said phenyl dichlorophosphate, and continuing the reaction until the condensation is substantially complete.

5. A process for preparing a resinous, polymeric organo-phosphonate containing phosphato groups which comprises heating in the presence of anhydrous magnesium chloride a mixture comprising approximately 50.0 mole percent of hydroquinone, from 0.1 to 49.9 mole percent of benzenephosphonyl dichloride and from 49.9 to 0.1 mole percent of phenyl dichlorophosphate, at a temperature of from 90° to 300° C., the said benzenephosphonyl dichloride being added in part to the full amount of the said hydroquinone and after this step of the reaction is substantially complete adding the remainder of the said benzenephosphonyl dichloride and all of the said phenyl dichlorophosphate, and continuing the reaction until the condenastion is substantially complete.

6. The polymeric products obtained in claim 1.
7. The polymeric product obtained in claim 2.
8. The polymeric product obtained in claim 4.

References Cited in the file of this patent

UNITED STATES PATENTS 2,435,252    Toy _____ Feb. 3, 1948

FOREIGN PATENTS 282,638    Switzerland _____ Sept. 1, 1952